United States Patent
Davidson et al.

[15] 3,666,845
[45] May 30, 1972

[54] PRODUCTION-SCALE FORMATION OF ULTRAHIGH PURITY CARBIDE POWDERS

[72] Inventors: Keith Vernon Davidson; Donald H. Schell, both of Los Alamos, N. Mex.

[73] Assignee: The United States of America as represented by the United States Atomic Energy Commission

[22] Filed: May 6, 1970

[21] Appl. No.: 35,303

[52] U.S. Cl. ..........................264/0.5, 252/301.1 R, 23/249
[51] Int. Cl. ..........................................................G21c 21/00
[58] Field of Search ..........................264/0.5; 252/301.1 R; 23/208 A, 349

[56] References Cited

UNITED STATES PATENTS

| | | | |
|---|---|---|---|
| 3,284,550 | 11/1966 | Riley et al. | 252/301.1 |
| 3,019,084 | 1/1962 | Amstein | 23/208 |
| 3,124,625 | 3/1964 | Sheinberg | 264/29 |
| 3,536,793 | 10/1970 | Norman et al. | 264/0.5 |
| 3,082,163 | 3/1963 | Ogard et al. | 264/0.5 |
| 3,375,073 | 3/1968 | McMullen | 23/349 |

*Primary Examiner*—Benjamin R. Padgett
*Assistant Examiner*—R. L. Tate
*Attorney*—Roland A. Anderson

[57] ABSTRACT

A method of forming ultrahigh purity carbide powders on a production scale which comprises blending metal oxide powders with elemental carbon powders and a partially polymerized furfuryl alcohol binder together with a suitable polymerization catalyst, extruding, polymerizing the binder, heating to 840° C for 48 hours in a soft vacuum, heating to 2,200° C for 1 hour in a helium atmosphere, cooling, crushing, and then heating to 2,000° C for 24 hours under a vacuum.

3 Claims, No Drawings

PRODUCTION-SCALE FORMATION OF ULTRAHIGH PURITY CARBIDE POWDERS

The invention described herein was made in the course of, or under, a contract with the U. S. Atomic Energy Commission. It relates to a method of forming carbides and, more particularly, to a method of forming carbide powders on a production scale which are of the desired stoichiometry and free of vestigial segregates and secondary phases.

Carbides of uranium and zirconium in solid solution having various uranium contents are of interest as nuclear materials capable of functioning at extremely high temperatures. However, the presence of vestigial segregates such as free carbon and oxygen is undesirable in most high-temperature applications. For example, when service temperatures exceed the carbide-carbon eutetic temperature, presence of free carbon may result in a structural failure because of formation of a melt. Subsolidus transformations, such as phase changes or precipitations, also impose limitations on the practical applications of these carbides. Therefore, for reasons of compatibility, stoichiometric UC-ZrC solid solutions are essential, i.e., vestigial segregates such as free carbon and secondary phases such as $U_2C_3$ or $UC_2$ cannot be tolerated.

In the prior art method of forming carbides, ultrahigh purity carbides such as those obtained utilizing the present invention could not be made except in small quantities based on the procedure described in U. S. Pat. No. 3,284,550 by Riley and Davidson, issued on Nov. 8, 1966. An essential step in the process of that patent is that the elemental constituents of the carbides be arc melted. As a consequence, the maximum amount of ultrahigh purity carbides that can be formed in a single run according to the process therein disclosed is only about 75 grams. This is essentially laboratory-scale production and hence extremely expensive if reasonably large quantities of the carbides are desired.

An object of the present invention is therefore to provide a method of preparing ultrahigh purity carbides or solid solutions thereof in production quantities which are substantially free of secondary phases and vestigial segregates such as interstitial carbon and oxygen.

Other objects of the invention will be apparent to one skilled in the art from reading the following specification.

The materials system utilized was $$(UC)_x(ZrC)_y$$

The desired ratio of uranium to zirconium was 1 mol uranium to 9 mols zirconium. The starting materials were $ZrO_2$, $UO_2$, 0.6 μm graphite flour, Thermax and Varcum binder. Experience has shown that this combination of ingredients produces a product which is very friable and easily ground into a powder. A brief description of the essential ingredients follows:

$ZrO_2$ — The $ZrO_2$ was reactor grade oxide having a Fisher average particle size of 5.4 μm with a maximum particle size of 20 μm.

$UO_2$ — The $UO_2$ was densified $UO_2$ (Oy or D–38) having an average particle size of about 4 μm.

0.6 μm graphite flour — The stock used to make this flour was reactor grade graphite which was ground and classified to a particle size of less than 10 μm. The Fisher average particle size was 0.6 μm.

Thermax — This material is essentially a spherical carbon black having a fairly uniform particle size of about 0.3 μm.

Varcum — The binder used was Varcum 8251 which is a partially polymerized furfuryl alcohol having a viscosity at room temperature of about 300 cps. The Varcum was catalyzed with 4 g maleic anhydride per 100 cc of resin.

Using the process of this invention, production quantities (i.e., about 15,000 grams) of the solid-solution carbide can be produced in a very pure state in a single run. Typically, to produce 14,800 grams of the 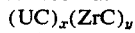 $(UC)_{.1}(ZrC)_{.9}$, the following amounts of ingredients are required:

0.6 μm graphite flour — 1458 g
Thermax — 1458 g
$ZrO_2$ — 13,955 g
$UO_2$ — 3355 g
Varcum 8251 — 3585 g The dry ingredients were first blended in a 16 qt twin-shell blender equipped with an intensifier bar and liquid addition apparatus. The ingredients were blended dry for 5 minutes using the intensifier bar. The Varcum binder was then added through the liquid addition apparatus over a period of about 15 minutes with the blender in operation. The lids and walls of the blender were scraped of adhering material and blending continued for 5 minutes.

The mix was then removed from the blender, passed through a meat chopper twice to warm and homogenize the mix, and extruded in a 100 ton press to a multihole configuration. The multiholed extrusions were extruded into graphite fixtures at a rate of 20 ft/min.

The extrusions, held straight in the fixture, were heated to 250° C over a period of 63 hours in a circulating air oven to polymerize the thermosetting Varcum binder. They were then transferred to another fixture and furnace and heated in a soft vacuum to 840° C over a period of 48 hours. They were then transferred again to another furnace and inductively heated in a susceptor to 2,200° C for 1 hour in a helium atmosphere. After this treatment the extrusions were weak and easily broken and crushed to a powder. Formulation was such that the high temperature treated product should contain only $(UC)_{.1}(ZrC)_{.9}$. The free carbon (0.6 μm and Thermax) added to the charge plus the carbon residue from the Varcum binder (estimated to be 45 percent of the binder) was sufficient to reduce the $ZrO_2$ and $UO_2$ and convert them to the carbides.

The product made in this manner was single phase solid solution $(UC)_{.1}(ZrC)_{.9}$; however, it still contained 5,500 ppm free carbon and 6,100 ppm oxygen. Therefore, a final vacuum treatment at 2,000° C for 24 hours was used to remove the excess carbon and lower the oxygen content. A typical analysis of carbides made in this manner follows:

Uranium — 20.14 ± 0.03 percent; zirconium — 69.60 ± 0.3 percent; total carbon — 10.12 ± 0.03 percent; free carbon — 260 ppm; oxygen — 360 ppm.

X-ray diffraction analysis and metallographic examination showed this product to be single phase solid solution carbide. These results confirm the feasibility of this procedure for the manufacture of large quantities of ultrahigh purity carbides.

Crushing of a hard brittle material such as $(UC)_{.1}(ZrC)_{.9}$ is very time consuming. It was found that the large batch of material prepared according to the process of this invention would crumble between one's fingers if fired in a helium atmosphere at 2,200° C for one hour. At 2,350° C it would still break up fairly easily but showed evidence of sintering and some of it had to be crushed in a carbide mortar and pestle. A temperature of 2,200° ± 50° C is adequate for the necessary chemical reaction and also produces a desirable structure for reducing to powder.

What is claimed is:

1. A method of forming ultrahigh-purity uranium and zirconium carbides and solid solutions thereof free of vestigial segregates and secondary phases which comprises (a) mixing the elemental constituents with the metal or metals present in the form of oxide powders and the carbon present in the form of graphite and carbon black powder and a suitable binder material and catalyst; (b) extruding; (c) polymerizing the binder material; (d) heating to 840° C in soft vacuum; (e) heating to 2,200° C in helium; (f) crushing; and (g) heating to 2,000° C in vacuum.

2. The method of claim 1 wherein the binder material is partially polymerized furfuryl alcohol and the catalyst is maleic anhydride.

3. The method of claim 2 wherein step (d) is carried on for 48 hours, step (e) for one hour, and step (g) for 24 hours.

* * * * *